(12) United States Patent
Victor et al.

(10) Patent No.: US 8,614,901 B2
(45) Date of Patent: Dec. 24, 2013

(54) INVERTER EMPLOYING A BOOST CHOPPER CIRCUIT AND A RESONANT CONVERTER CIRCUIT

(75) Inventors: Matthias Victor, Niestetal (DE);
Burkhard Müller, Kassel (DE);
Andreas Falk, Kassel (DE)

(73) Assignee: SMA Solar Technology AG, Niestetal (DE)

( * ) Notice: Subject to any disclaimer, the term of this patent is extended or adjusted under 35 U.S.C. 154(b) by 950 days.

(21) Appl. No.: 11/977,270

(22) Filed: Oct. 23, 2007

(65) Prior Publication Data

US 2008/0055941 A1 Mar. 6, 2008

(51) Int. Cl.
| H02M 3/335 | (2006.01) |
| H02M 7/519 | (2006.01) |
| H02M 7/521 | (2006.01) |
| H02M 7/523 | (2006.01) |

(52) U.S. Cl.
USPC ............ 363/17; 363/21.02; 363/39; 363/124; 323/299

(58) Field of Classification Search
USPC ............. 363/17, 21.02, 56.02, 123, 124, 131, 363/132, 24–26, 39–41; 323/266, 299, 301, 323/302
See application file for complete search history.

(56) References Cited

U.S. PATENT DOCUMENTS

| 4,533,986 A | | 8/1985 | Jones |
| 4,570,211 A | * | 2/1986 | Manda et al. ................... 363/23 |
| 5,170,336 A | * | 12/1992 | Getter et al. .................. 363/141 |
| 5,293,145 A | * | 3/1994 | Rynkiewicz ..................... 336/65 |
| 5,500,576 A | | 3/1996 | Russell et al. |
| 5,835,367 A | * | 11/1998 | Pan et al. .......................... 363/61 |
| 6,023,416 A | * | 2/2000 | Shikata et al. ................... 363/17 |
| 6,324,080 B1 | * | 11/2001 | Laeuffer ......................... 363/25 |
| 6,349,044 B1 | * | 2/2002 | Canales-Abarca et al. ..... 363/17 |
| 6,583,999 B1 | | 6/2003 | Spindler et al. |
| 6,657,873 B2 | * | 12/2003 | Igarashi .......................... 363/17 |
| 6,885,273 B2 | * | 4/2005 | Min et al. ...................... 336/178 |
| 6,911,848 B2 | * | 6/2005 | Vinciarelli ..................... 327/108 |
| 6,930,896 B2 | * | 8/2005 | Mizokami et al. .............. 363/24 |
| 7,042,740 B2 | * | 5/2006 | Morimoto et al. .............. 363/24 |
| 7,061,777 B2 | * | 6/2006 | Zeng et al. ...................... 363/17 |
| 7,286,373 B1 | * | 10/2007 | Liu et al. ......................... 363/16 |
| 2002/0067631 A1 | * | 6/2002 | Lunding et al. ............... 363/131 |

(Continued)

FOREIGN PATENT DOCUMENTS

| DE | 19543419 A1 | 5/1997 |
| DE | 19750041 C1 | 1/1999 |

(Continued)

OTHER PUBLICATIONS

Patent Abstracts of Japan 10 155280, Jun. 9, 1998 (Omron Corp).

(Continued)

*Primary Examiner* — Adolf Berhane
*Assistant Examiner* — Nusrat Quddus
(74) *Attorney, Agent, or Firm* — Eschweiler & Associates, LLC

(57) ABSTRACT

An inverter with galvanic separation including a resonant converter and an upstream mounted boost chopper is intended to provide galvanic separation in the context of a variable input and output voltage as it exists in photovoltaic systems, with the efficiency being intended to be optimized over the entire input voltage range. This is achieved in that a boost chopper or a buck chopper is mounted upstream of the resonant converter.

23 Claims, 5 Drawing Sheets

(56) References Cited

U.S. PATENT DOCUMENTS

| | | |
|---|---|---|
| 2003/0006745 A1* | 1/2003 | Hammerstrom et al. ..... 323/283 |
| 2003/0007366 A1* | 1/2003 | Drummond et al. ............ 363/17 |
| 2004/0151011 A1* | 8/2004 | Toyomura et al. ............ 363/146 |
| 2006/0132997 A1* | 6/2006 | Chu et al. ........................ 361/79 |
| 2007/0145956 A1* | 6/2007 | Takeuchi ..................... 323/207 |

FOREIGN PATENT DOCUMENTS

| | | | |
|---|---|---|---|
| DE | 198 27 872 | A1 | 12/1999 |
| DE | 101 12 982 | A1 | 9/2002 |
| EP | 1 227 570 | A | 7/2002 |
| EP | 1 427 091 | A | 6/2004 |
| EP | 1 531 542 | A2 | 5/2005 |
| JP | 2002010496 | | 1/2002 |

OTHER PUBLICATIONS

Patent Abstracts of Japan 2002 010497, Jan. 11, 2002 (Sharp Corp).
Prasad A R et al "An active power factor correction technique for three-phase diode rectifiers" Jan. 1, 1991.
A. Lohner, et al., "A New Panel-Integratable Inverter Concept for Grid-Connected Photovoltaic Systems", IEEE 1996, p. 827-831.

* cited by examiner

INVERTER EMPLOYING A BOOST CHOPPER CIRCUIT AND A RESONANT CONVERTER CIRCUIT

FIELD

The invention relates to an inverter as set forth in the preamble of claim 1.

BACKGROUND

An input converter for railbound vehicles is known from DE 198 27 872. It consists of a resonant converter with galvanic separation. Input/output voltage ratio is fixed. In loss optimized operation, the fixed input/output voltage ratio is determined by the transformation ratio of the transformer.

Due to varying ambiant conditions (solarization, temperature, . . . ) and different generator designs, inverters in photovoltaic systems must be designed for a wide input voltage range and at the same time be highly efficient over this entire range.

SUMMARY

The invention is directed to an inverter which, in the context of a wide input voltage range as it is given in photovoltaic systems and of variable mains voltage, provides galvanic separation, with the efficiency being intended to be optimized over the entire input voltage range.

The invention enables optimum efficiency in operation of the inverters in the case of varying solarization and temperature of the photovoltaic modules or of different photovoltaic module configurations. The switching losses are minimized by the fact that the resonant converter operates independently of the input voltage at a constant operating point, this operating point being set over a wide input voltage range by the boost chopper. Provided the voltage at the resonant converter is stabilized, a boost chopper is more beneficial than a buck chopper insofar as the resonant converter achieves higher efficiency at higher stabilized input voltages.

The inverter of the invention combines advantages with respect to voltage adaptation and operation of a HF circuit without the tradeoff of adverse power and voltage ratings, high repetition rate of the adaptation stage, switching overvoltages and limited range of operation.

In an advantageous developed implementation of the converter of the invention, there is provided that the inverter is configured to be a single-phase inverter, with a power electronic half-bridge circuit, a series resonant capacitance and a high frequency transformer being provided. While the resonant converter operates at a constant operating point so that its input/output voltage ratio, which is dictated by the transformation ratio of the transformer, is fixed, the input voltage at the boost chopper may vary.

The boost chpper may advantageously be configured for permanent interval operation so that the free-wheeling diode of the boost chopper will never experience hard switching communication at turn-off. EMC transients are thus reduced and efficiency is increased as turn-on power losses are avoided.

The boost chopper need not be activated if the input voltage $U_0$ is high enough for the voltage at the capacitor $C_{mains}$ to be sufficient for mains electricity supply. As a result, it is activated only if the actual mains voltage is so high that the actual PV voltage is not sufficient to set the voltage at the $C_{mains}$.

Efficiency is significantly improved using such a method since the losses are low in operating points without boost chopper operation. This is particularly efficient if the boost chopper reactors are particularly small due to the interval mode design, thus comprising very low ohmic resistances.

Appropriately, the repetition rate of the half-bridge circuit is lower than the resonance frequency. Said resonance frequency is obtained from the leakage inductance of the transformer and the series resonant capacitance. As a result, the semiconductors are zero-current switched, both on and off.

According to another advantageous developed implementation of the invention, there is provided a synchronous activation of the boost chopper and the resonant converter. Synchronous activation has the advantage to minimize the effective current load in the capacitors (C3, C4).

A particular effect of benefit is obtained if the transformer is configured to be a planar transformer having two printed circuit boards, with the primary winding being disposed on the one printed circuit board and the secondary winding on the other printed circuit board. The advantage thereof is that the printed circuit boards are coupled via a magnetic flux, which allows the expensive plug-and-socket connectors to be eliminated altogether. A cast housing, which is manufacturable at a lower cost than a corresponding sheet metal housing, comprises projections for good integration of such a planar transformer having two overlapping printed circuit boards with regard to cooling.

The leakage inductance of the planar transformer may be beneficially increased by introducing an additional reactor core with an air gap (FIG. 3).

One exemplary embodiment is discussed in closer detail with reference to the drawings, with further advantageous developed implementations of the invention and their advantages being described.

DESCRIPTION

Figure 1:
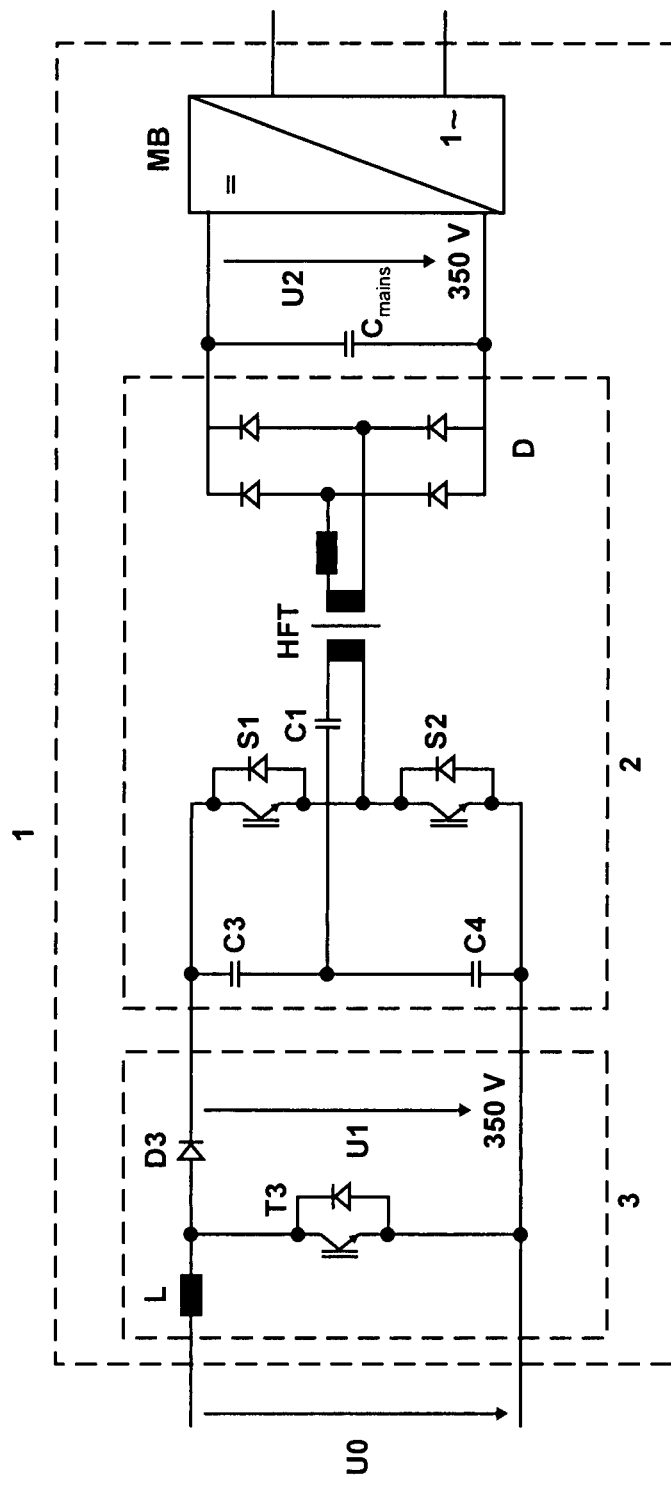
FIG. 1 shows a schematic diagram of an inverter of the invention.

In the FIGS., like elements bear the same reference numerals.

FIG. 1 shows an inverter 1 of the invention for photovoltaic systems. It comprises a boost chopper 3, a resonant converter 2 and a mains bridge MB. The resonant converter consists of a half-bridge circuit with the semiconductor switches S1, S2 and a HF transformer HFT, which is provided with a series resonant capacitance or rather a capacitor C1, and of a semiconductor bridge D. Input/output ratio of the resonant converter 2 is fixed and dictated by the transformation ratio of the transformer. Together with the rectifier bridge D, the resonant converter forms an HF circuit.

In accordance with the invention, a boost chopper 3 is mounted upstream of the resonant converter 2. Alternatively, a buck chopper may be mounted upstream of the resonant converter.

The boost chopper serves to adapt the voltage to voltage variations of the photovoltaic generator that may occur as a result of diverse operating conditions (solarization, temperature, . . . ), different generator designs or dynamic adaptations to different mains voltage levels.

The boost chopper consists of a series reactor L, a switching element T3 and a diode D3 that are arranged in parallel to the half-bridge circuit and to two series-mounted capacitors $C_3$, $C_4$. The capacity of the capacitors $C_3$, $C_4$ is thereby greater than the series resonant capacitance (capacitor $C_1$).

The boost chopper operates in an input voltage range $U_0$ of 150 to 350 volt. The voltage $U_1$ applied downstream of the boost chopper is about 350 volt. The voltage $U_2$ at the output of the resonant converter also is 350 volt. If the input voltage is in excess of 350 volt, the boost chopper is not clocked and the voltages $U_1$ and $U_2$ increase proportionally with $U_0$.

The resonant DC/DC converter 2 is operated unidirectionally with the circuit shown in FIG. 1. Other circuit arrangements for bidirectional operation are also possible, though.

The boost chopper 3 and the resonant converter 2 are activated synchronously in order to reduce the effective current load in the capacitors.

Figure 2:
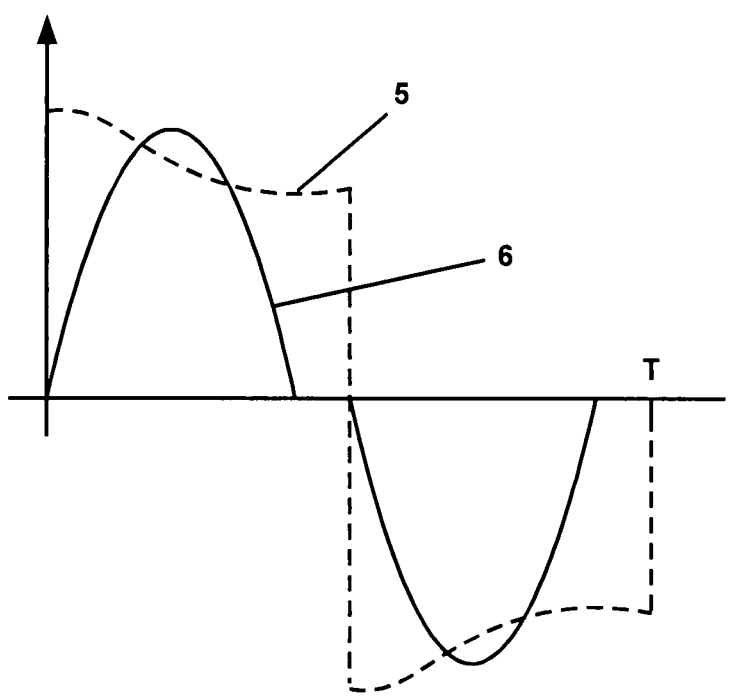
FIG. 2 shows a voltage/current diagram of the resonant converter.

FIG. 2 shows the transformer voltage 5 and the transformer current 6 with the cycle duration of $T=1/f_{switch}$, wherein $f_{switch}$ is the switching frequency of the HF circuit.

It is preferred that the repetition rate of the half-bridge circuit be lower than the resonance frequency, which is obtained from the leakage inductance of the transformer and the series resonant capacitance.

Figure 3:
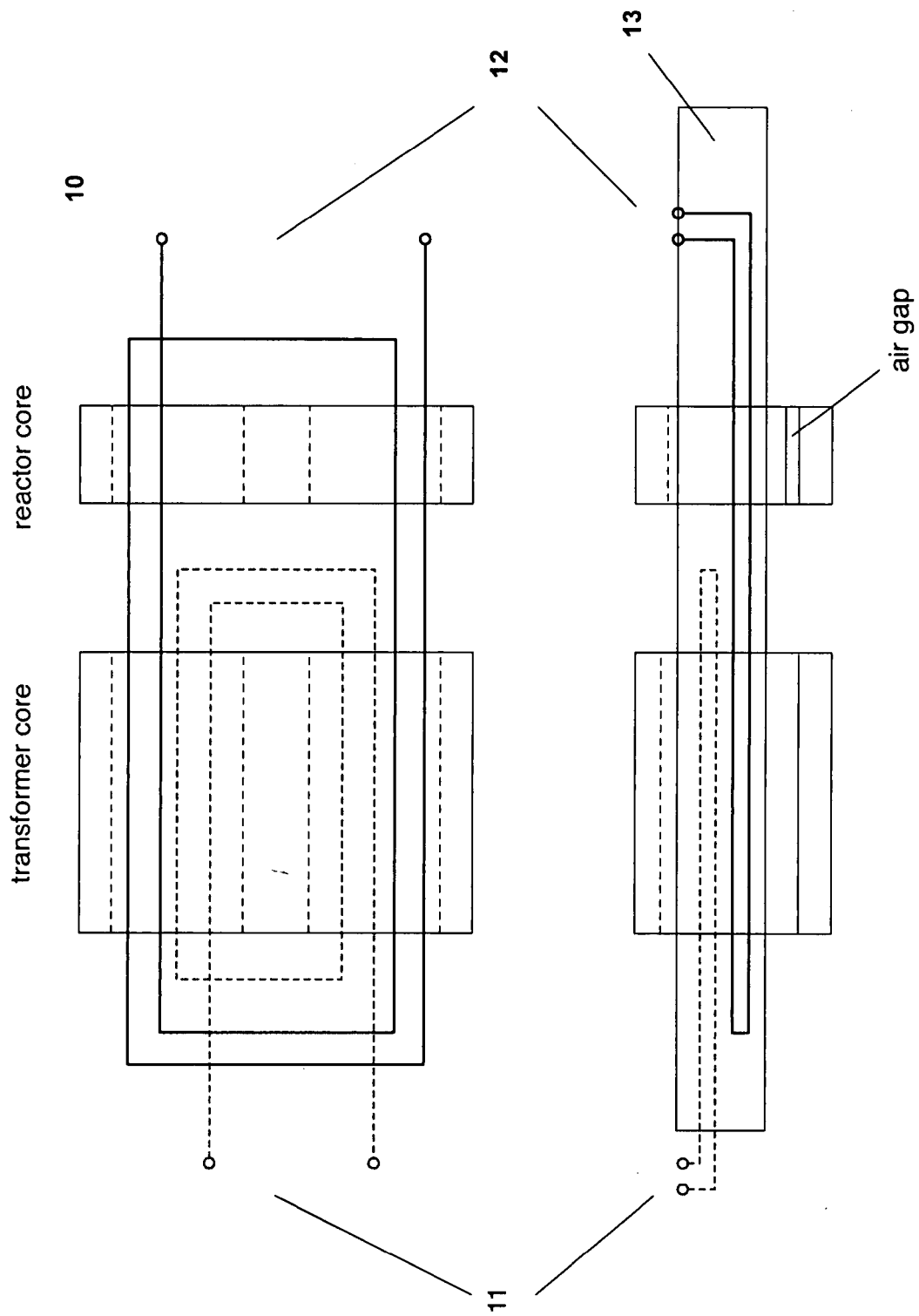
FIG. 3 shows an illustration of a planar transformer.
Figure 4:
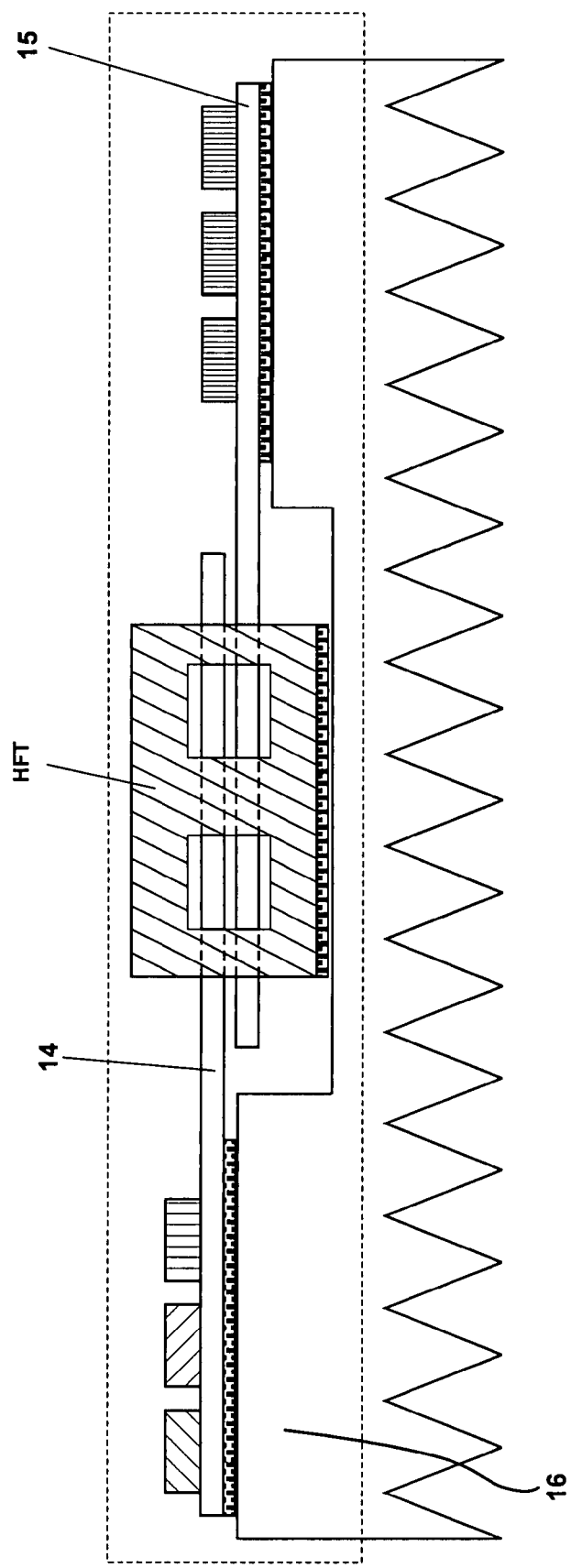
FIG. 4 shows a sectional view of the planar transformer.

The transformer HFT is configured to be a planar transformer 10, as illustrated in the FIGS. 3 and 4. Said transformer comprises a primary winding 11 and a secondary winding 12 that are disposed on one printed circuit board 13 or on two printed circuit boards 14 and 15 (FIG. 4). The printed circuit board is connected to an aluminium cast housing 16 via two insulating heat conducting foils. The line semiconductors are mounted on the printed circuit boards 14 and 15, more specifically as SMD components.

Figure 5:
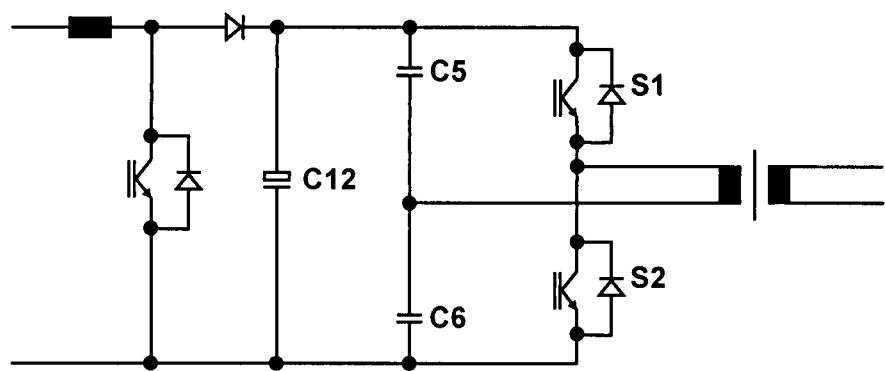
FIG. 5 shows an advantageous switching variant of FIG. 1.

FIG. 5 shows a circuit variant in which the load current conducting capacitor C1 has been eliminated and the resonant capacitance is drawn into the DC circuit in the form of C5 and C6. The capacitors C3 and C4 with quite high capacitance are replaced by the sole capacitor $C_{12}$. Two smaller resonance capacitors C5, C6 with small capacitance are mounted in parallel thereto. The advantage of this circuit is that on the one side the sum of the capacitor currents is reduced so that the costs of the capacitors are lowered and that on the other side the switching losses are significantly reduced.

In the circuit shown in FIG. 5, the switching losses are reduced over the circuit shown in FIG. 1 since the magnetizing current of the transformer causes the parasitic switch capacitances to be discharged during the recovery time in which the two switches are open with the switch voltage being reduced to the value of the voltage of the respective resonance capacitor minus half the intermediate circuit voltage, as a result thereof, before S1 or S2 are switched on again.

In the circuit shown in FIG. 1, by contrast, the parasitic switch capacitances of S1 and S2 can only discharge to the value of the resonance capacitance C1 during the recovery time before being switched on again so that the switching losses are accordingly higher.

The invention claimed is:
1. An inverter, comprising:
a boost chopper circuit configured to receive a DC input signal and generate a regulated DC voltage at an output thereof when the boost chopper circuit is activated, and configured to pass a voltage associated with the DC input signal to the output thereof when the boost chopper circuit is deactivated; and
a resonant converter circuit configured to receive a received voltage from the output of the boost chopper circuit, and generate a DC output voltage having galvanic separation with respect to the DC input signal from the received voltage,
wherein the boost chopper circuit is configured to be deactivated when the received voltage at the resonant converter, or a voltage associated therewith, is greater than a predetermined threshold value, wherein a duty cycle of the boost chopper circuit, when deactivated, is zero.

2. The inverter of claim 1, wherein a switching of the boost chopper circuit, when activated, and a switching of the resonant converter are synchronous with one another.

3. The inverter of claim 1, wherein the resonant converter comprises a half-bridge circuit coupled to a high frequency transformer through a series resonant capacitance.

4. The inverter of claim 3, wherein a resonant frequency of the resonant converter is greater than a switching frequency thereof.

5. The inverter of claim 1, wherein the boost chopper circuit, when activated, is configured to operate in an interval mode.

6. The inverter of claim 1, wherein the resonant converter comprises a high frequency transformer.

7. The inverter of claim 6, wherein the high frequency transformer comprises a primary winding and a secondary winding, and wherein a first terminal of the primary winding has a resonant capacitance associated therewith, that is in turn coupled to a common node of two series connected capacitors coupled across input terminals of the resonant converter.

8. The inverter of claim 7, wherein first and second terminals of the secondary winding of the high frequency transformer are coupled to input terminals of a full bridge circuit.

9. The inverter of claim 6, wherein the resonant converter comprises:
two series connected switches having a common node terminal coupled to a first terminal of a primary winding of the high frequency transformer;
two series connected capacitors connected in parallel with the two series connected switches, the two series connected capacitors having a common node coupled to a second terminal of the primary winding of the high frequency transformer.

10. The inverter of claim 9, further comprising another capacitor connected in parallel with the two series connected capacitors.

11. The inverter of claim 10, further comprising a series resonant capacitance coupled between the first terminal of the primary winding of the high frequency transformer and the common node of the two series connected capacitors.

12. The inverter of claim 6, wherein the high frequency transformer comprises a planar transformer.

13. The inverter of claim 12, wherein the planar transformer comprises a primary winding and a secondary winding, and wherein the primary winding is associated with one printed circuit board, and the secondary winding is associated with another printed circuit board.

14. The inverter of claim 12, wherein the planar transformer comprises a primary winding and a secondary winding, and wherein the secondary winding is wrapped around a transformer core, and the primary winding is wrapped around a reactor core having an air gap and the transformer core.

15. The inverter of claim 1, further comprising a photovoltaic generator coupled to generate the DC input signal and provide the DC input signal to the boost chopper circuit.

16. The inverter of claim 1, further comprising a DC/AC converter coupled to the resonant converter circuit, and configured to receive the DC output voltage and generate an AC output voltage associated therewith.

17. An inverter having galvanic isolation, and configured to receive a varying DC input voltage, comprising:
   a boost chopper circuit configured to receive the DC input voltage, and provide an intermediate DC voltage, wherein the intermediate voltage is substantially constant over variations in the DC input voltage for a range of DC input voltages below a predetermined threshold; and
   a resonant converter downstream of the boost chopper circuit, and configured to receive the intermediate DC voltage, wherein the resonant converter operates at a constant operating point independent of variations in the DC input voltage.

18. The inverter of claim 17, further comprising a bridge circuit downstream of the resonant converter, and configured to receive a second intermediate DC voltage from the resonant converter and generate an AC voltage associated therewith.

19. The inverter of claim 17, wherein the resonant converter comprises:
   an intermediate circuit having two series-connected capacitances connected together at a first center node, and configured to regulate the intermediate DC voltage;
   a half-bridge circuit comprising two series-connected switches connected together at a second center node, the half-bridge circuit in parallel with the intermediate circuit;
   a transformer having a first terminal of a first winding connected to the first center node via a series resonance capacitance, and a second terminal of the first winding connected to the second center node, and having a second winding with first and second terminals associated therewith; and
   a semiconductor bridge circuit having a first input coupled to the first terminal of the second winding and a second input coupled of the second terminal of the second winding, and having first and a second outputs that together output the second intermediate DC voltage.

20. The inverter of claim 19, wherein the semiconductor bridge circuit comprises:
   a first pair of series-connected diodes connected together at a third center node;
   a second pair of series-connected diodes connected together at a fourth center node,
   wherein the first and second pair of diodes are in parallel with one another, and
   wherein the first terminal of the second winding of the transformer is coupled to the third center node, and the second terminal of the second winding of the transformer is coupled to the fourth center node.

21. The inverter of claim 17, wherein the boost chopper circuit is configured to pass the DC input voltage to the resonant converter when the DC input voltage is greater than the predetermined threshold.

22. The inverter of claim 17, wherein the boost chopper circuit and the resonant converter are activated synchronously.

23. The inverter of claim 19, wherein the transformer is a planar transformer.

* * * * *